United States Patent [19]

Falk

[11] 3,707,747
[45] Jan. 2, 1973

[54] INSERT FOR CUTTING TOOL
[75] Inventor: Willi Falk, Tonisvorst, Germany
[73] Assignee: Deutsche Edelstahlwerke A.G., Krefeld, Germany
[22] Filed: Jan. 27, 1971
[21] Appl. No.: 110,168

[30] Foreign Application Priority Data

Jan. 31, 1970   Germany.....................P 20 04 387.2

[52] U.S. Cl............................................29/95, 29/96
[51] Int. Cl. .................................................B26d 1/00
[58] Field of Search........................29/95, 96, 97, 98

[56] References Cited

UNITED STATES PATENTS

| 2,641,048 | 6/1953 | Vreeland | 29/95 |
| 3,188,717 | 6/1965 | Heinlein | 29/96 |
| 3,226,797 | 1/1966 | Hertel | 29/95 |
| 3,289,271 | 12/1966 | Stier | 29/95 |
| 3,316,616 | 5/1967 | Milewski | 29/96 |
| 2,502,922 | 4/1950 | Bura | 29/95 |
| 2,897,580 | 8/1959 | Huber | 29/96 |

Primary Examiner—Harrison L. Hinson
Attorney—Kenyon & Kenyon Reilly Carr & Chapin

[57] ABSTRACT

The disclosure is directed to an insert of hard metal material which when mechanically clamped to a recessed toolholder can serve as a cutting tool. The upper and lower faces of the insert have a substantially rhomboidal form and thus the insert is substantially in the form of a rhombohedron. The insert is provided with two single-point cutting edges which are disposed adjacent to opposite corners of the insert, each of which is in the form of an acute angle. By providing each of the cutting edges on a different opposite side of the insert as well as diagonally opposite one another, the insert when mounted in a toolholder can alternately present either of the cutting edges in an operative position. As a result the useful life of the insert between sharpening operations can be appreciably extended. As determined by the positioning of the recess in the toolholder, the insert can be mounted therein with a predetermined back rake angle extending from a substantially zero value to a positive back rake angle. Adjacent to each of the side cutting edges of the insert there is provided a groove which can serve as a chip breaker for a chip cut from a work surface. The surface of the groove extending toward and terminating in the side cutting edge can be provided with a positive side rake angle even though the face of the insert is disposed in the toolholder with a negative side rake angle. In this way both the back rake angle and the side rake angle can be established to be positive.

5 Claims, 8 Drawing Figures

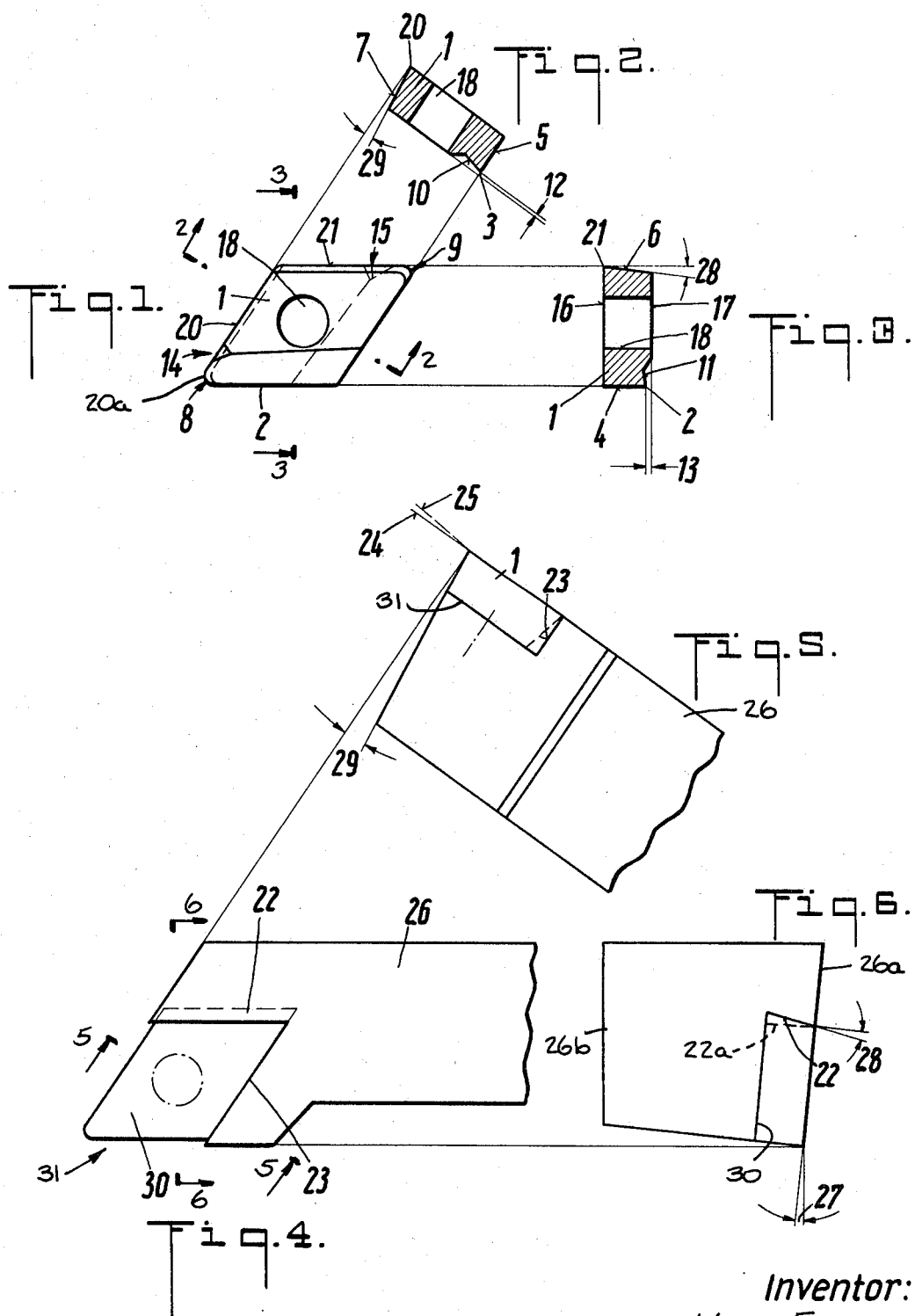

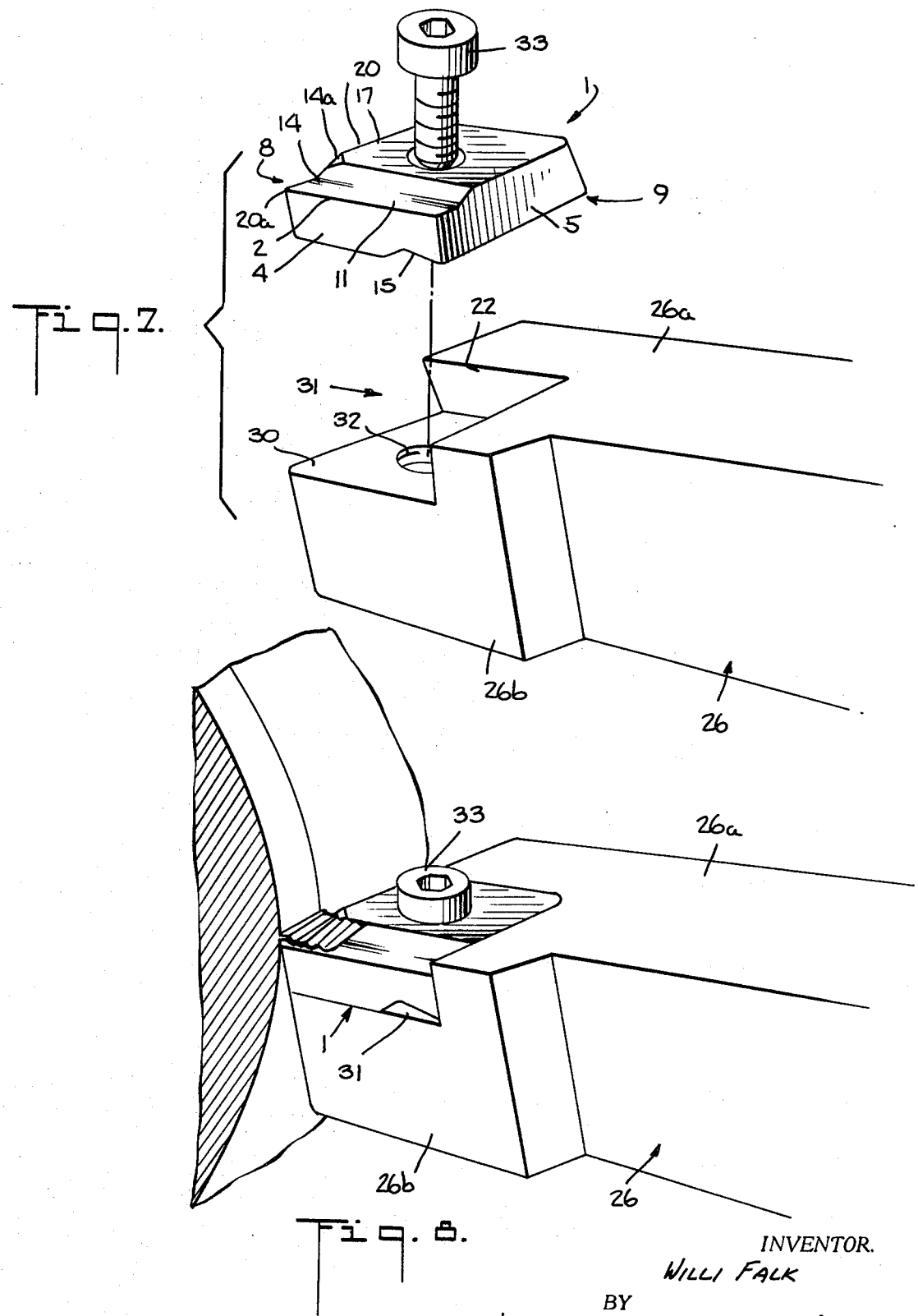

3,707,747

INSERT FOR CUTTING TOOL

BACKGROUND OF THE INVENTION

The insert of the invention is used to provide the cutting edge of a single-point tool which is generally defined as a cutting tool for use in a lathe, turret lathe, planer, shaper, boring mill, etc., having one face and one continuous cutting edge which produces a machined surface. Single-point cutting tools fall into the general classes of solid tools and tipped tools. In a solid tool the full section of the cutting end or point of the tool consists of hard metal cutting material. Thus either the complete point of the tool or the point and the shank of the tool together may be formed of the hard metal cutting material. On the other hand a tipped tool is a tool having a relatively small chip of metal-cutting material attached to a tool shank of a non-cutting material. Thus a tipped tool includes a tip which is a chip of cutting-tool material attached to the shank of the tool by brazing, welding, clamping and the like.

Tipped tools having mechanically clamped tips often include inserts which are substantially flat in form and which are clamped to a recessed toolholder. Cutting tools having mechanically clamped inserts are often used for hogging cuts on lathes and planers. An advantage of the mechanically clamped insert is that the possibility of introducing strains in the insert by brazing it into the toolholder are eliminated. By way of example, mechanically clamped inserts are often formed from cemented carbide material. It is important that the insert be properly mounted in the toolholder since the edge strength of the insert is dependent upon the support given to its cutting edge.

The insert for a cutting tool can be provided with a "chip breaker" which controls the chip and the length of the chip being cut. Such a construction is particularly essential when machining steels and some of the bronzes and the aluminum alloys. On the other hand the provision of a chip breaker may not be required when machining the "short-chip" materials such as cast iron, brass and the non-metalic materials. The most widely used type of chip breaker is the "ground-in step" type. The ground-in step extends parallel or at an angle to the side cutting edge of the tool. Experience has shown that if the chip being formed is too tight, the chip breaker should be widened. On the contrary if the chip is too loose, it is necessary to narrow the chip breaker. Where the depth of the chip breaker is too shallow the chip may be too loose. In the alternative where the chip breaker is too deep, the chip may curl tightly and lead to chipped cutting edges or broken tips.

In accordance with the prior art mechanically clamped inserts have typically been round, triangular and square in form when viewing the upper face of the insert. The prior art inserts have typically been mounted on the toolholder by means of a capscrew extending through an opening in the insert in the insert and threadedly engaged to a tapped whole in the toolholder. In certain arrangements in the prior art a clamp plate is positioned over a portion of the insert. The clamp plate is provided with an opening in alignment with that of the insert in order that the capscrew can extend through the clamp and force it in a clamping relationship with respect to the face of the insert.

SUMMARY OF THE INVENTION

One of the objects of the invention is to provide an insert for forming a metal cutting tool with the insert having a plurality of selectable cutting edges.

Another object of the invention is to provide an insert for forming a metal cutting tool with the insert containing a chip breaker for each of its plurality of cutting edges.

It is an additional object of the invention to provide an insert for forming a metal cutting tool with the insert being adapted to be mechanically locked into a toolholder.

It is a further object of the invention to provide an insert for forming a metal cutting tool with the insert having substantially positive back rake and side rake angles.

The invention comprises a reversible insert for forming a metal cutting tool when the insert is mounted in a recess disposed in an end portion of a toolholder. The insert is substantially in the shape of a rhombohedron and is made of a hard material. The insert has a pair of flat faces each of which are substantially rhomboidal in form and which extend substantially parallel and spaced apart with respect to one another. Each of the faces has oppositely disposed corner portions which are substantially in the form of an acute angle. A cutting edge is formed at one of the corner portions of each of the faces. The cutting edges are disposed diagonally opposite one another. Each of the cutting edges includes a side cutting edge formed by the junction of a side flank of the insert with a face thereof, an end cutting edge formed by the junction of an end of the insert with the face thereof, and a nose portion formed by the intersection of the side cutting edge and the end cutting edge. In the face portion extending away from each of the cutting edges there is provided a groove which extends from the nose portion and adjacent to the length of the side cutting edge. The groove is adapted to break a chip of metal when cut from a workpiece by a cutting edge of the insert. The surface of the groove is bevelled adjacent to the side cutting edge. The bevelled portion provides a positive rake angle for the insert when it is mounted in the toolholder with a face thereof disposed at a negative side rake angle. By simply reversing the insert in the recess of the toolholder either of the cutting edges can be placed in an operative position.

BRIEF DESCRIPTION OF THE DRAWINGS

FIG. 1 is a plan view of the insert of the invention showing a rhomboidal-shaped face of the insert and the acute nose angle of each of its two cutting edges;

FIG. 2 is a vertical section view taken along the line 2—2 in FIG. 1 and showing one of the normal end-relief angles and one of the chip breakers of the insert;

FIG. 3 is a vertical sectional view taken along the line 3—3 in FIG. 1 and showing the normal end-relief angle and the chip breaker of the other cutting edge of the insert;

FIG. 4 is a plan view of the recess in the toolholder for mounting the insert;

FIG. 5 is a vertical section view taken along the line 5—5 in FIG. 4 and showing the insert mounted in the recess of the toolholder;

FIG. 6 is a vertical section view taken along the line 6—6 in FIG. 5 and further showing the recess in the toolholder for the insert;

FIG. 7 is an enlarged exploded perspective view showing the insert of the invention and the recess in the toolholder for mounting the insert; and FIG. 8 is an enlarged perspective view of the insert of the invention mounted in a toolholder and adjacent to a workpiece from which a chip is being cut.

DESCRIPTION OF THE PREFERRED EMBODIMENT

Cutting tool insert 1 (FIGS. 1–3) is substantially in the form of a rhombohedron, that is to say a six-sided prism whose faces are parallelograms having oblique angles. Thus each of faces 16 and 17 of the insert are substantially in the form of a rhombus, that is to say an equilateral parallelogram having its angles oblique. The insert is made to be reversible with respect to toolholder 26 (FIGS. 4–6) by being provided with cutting edge 8 adjacent to face 17 and cutting edge 9 adjacent to face 16 (FIGS. 1–3 and 7). The cutting edge of the insert is that portion of the face edge along which the chip is separated from the work. Thus cutting edge 8 comprises side cutting edge 2, end cutting edge 20 and nose 20a. Side flank 4 of the insert is disposed substantially at right angles to faces 16 and 17 and thus the normal side-relief angle of side flank 4 is substantially zero.

As show in FIG. 1 the nose angle between the side cutting edge 2 and the end cutting edge 20 is an acute angle. The end cutting edge angle between the end cutting edge 20 and a line parallel to the length of the toolholder 26 is an appreciable angle although an acute one.

As shown in FIG. 2, end 7 along which end cutting edge 20 extends is disposed at an angle 29 to the surfaces of faces 16 and 17. Thus, angle 29 is the normal side-relief angle.

Insert 1 is provided with chip breaker 14 which extends adjacent to side cutting edge 2. The chip breaker can be the ground-in step type. The width of the chip breaker is varied to control chip curl, i.e., narrow for tight curls, wider for loose curls and heavy feeds. When the chip breaker extends substantially parallel to the side cutting edge, it can be effective when cutting stock which is eccentric and thereby produces an irregular depth of cut.

As shown in FIG. 3 chip breaker 14 is in the form of a groove. The bottommost portion of the groove of the chip breaker extends outwardly toward face 17 and side cutting edge 2 in bevelled portion 11. Consequently, the bevelled portion 11 of the chip breaker 14 extending along the side cutting edge is disposed at an angle with respect to face 17 of the insert. The chip breaker can be provided with flat 14a which intersects face 17 and end cutting edge 20 (FIG. 7).

Since insert 1 is a reversible insert having both cutting edges 8 and 9, it is provided with side cutting edge 3 disposed adjacent to side flank 5 (FIG. 2). In addition, as shown in FIGS. 1 and 3, cutting edge 9 includes end cutting edge 21 extending from nose 9a. End cutting edge 21 extends along end 6 which is disposed at angle 28 (FIG. 3), the normal side-relief angle. Further as shown in FIG. 2, side cutting edge 3 adjacent to which chip breaker 15 extends is disposed beneath the surface of face 16 of the insert by a dimension identified by reference numeral 12. In FIG. 3, reference numeral 13 similarly as reference numeral 12 identifies the degree of the undercut of the chip breaker 14 at the side cutting edge. Again, as in the case of chip breaker 15, the surface of chip breaker 15 includes bevelled portion 10 extending toward the surface of face 16 and side cutting edge 3. Chip breaker 15 can be provided with flat 15a similar to flat 14a.

As shown in FIGS. 4–6 toolholder 26 is provided with a recess 31 into which insert 1 is mounted. The recess includes face 30 which is contiguous with either of faces 16 or 17 when the insert is mounted upon toolholder 26. Face 30 is provided with tapped hole 32 which is adapted to receive socket screw 33 for mounting and securing insert 1 with respect to the recess in the toolholder. Face 22 of the recess, as shown in FIGS. 4 and 6, is undercut with respect to upper surface 26a of the toolholder and thereby forms angle 28a as shwon in FIG. 6. Angle 28a is the same angle as the normal end-relief angles 28 and 29 of ends 6 and 7, respectively, of the insert. Consequently, when the insert is mounted in the recess in the toolholder, either of ends 6 or 7 are adapted to mate with respect to face 22 of the recess.

Since the surfaces of side flanks 4 and 5 are disposed at substantially right angles to faces 16 and 17, face 23 of recess 31 in the toolholder correspondingly is disposed at a substantially right angle to face 30 of the recess. Consequently, side flanks are adapted to mate directly with respect to face 23 of the recess. Here it should be noted that the undercut of face 22 including angle 28a, as well as face 23 enable the insert to be rigidly supported with respect to the toolholder when the insert is clamped by capscrew 33 against face 30 of the toolholder.

As shown in FIG. 5 toolholder 26 is provided with shoulder 26b through which recess 31 extends. This type of tool-holder when supporting insert 1 can be effectively employed in a lathe such as a turret lathe in turning a workpiece to a square shoulder on the workpiece.

As shown in FIG. 5 recess 31 can be formed in toolholder 26 such that faces 16 or 17 of the insert extends at a neutral or zero back rake angle 24 or at a positive back rake angle 25. As shown in FIG. 6 upper surface 26a and face 30 of the recess extend at an angle 27 to base 26b of the toolholder. Consequently, when insert 1 is mounted in recess 31, faces 16 and 17 are disposed at a side rake angle 27 which in accordance with the convention is a negative side rake angle. A negative side rake angle occurs when the face of a tool, such as the face of the insert, extends upwardly away from the side cutting edge such as that of the insert.

Even though the faces of the insert 1 are disposed at a negative side rake angle 27, as shown in FIG. 6, a positive side rake angle of the portion of the insert extending away from the side cutting edges is obtained by the sloping of the surfaces of the groove of the chip breaker toward the face of the side cutting edge of the insert as shown in FIGS. 2 and 3. Consequently, even though the insert is inclined in the manner shown in FIG. 6, the side cutting edge operates with a positive side rake angle. In this way the advantages of either a neutral or positive back rake angle and a positive side rake angle can be obtained when using the insert of the invention.

As shown by dash lines in FIGS. 5 and 6, shims or plugs 22a and 23a can be used to vary the angular relationship of faces 22 and 23, respectively, with respect to face 30. In this way, the rake angles of the insert can be further adjusted.

I claim:

1. A metal cutting tool including a reversible hard cutting insert formed as a rhombohedron prism having mutually parallel flat faces which are parallelograms having diagonally opposite corners respectively forming oblique angles and acute angles; two sides of sad prism being at right angles to said faces and extending in opposite directions from one of said corners forming oblique angles to said corners forming acute angles, each of said faces having chip breaker grooves formed therein extending from said one of said corners along the lengths of said right angular sides and forming therewith first cutting edges; and the other two sides of said prism respectively being at acute angles to said faces in opposite directions therefrom and extending in opposite directions from the other of said corners forming oblique angles to said corners forming acute angles, said sides which are at acute angles to said faces forming with the latter cutting edges joining and merging with said first cutting edges at said diagonally opposite corners of said faces forming acute angles and thereby forming a cutting nose at each of the last-named corners to which said cutting edges extend and merge and which noses are diagonally located on the opposite faces of said prism.

2. The tool of claim 1 in which said grooves transversely have V-shapes providing flat surfaces extending upwardly to said right angular sides to form cutting edges therewith.

3. The tool of claim 2 in which the other flat surfaces of said V-shaped grooves at their ends adjacent to said cutting noses include flat surfaces intersecting the adjacent faces of said prism and the adjacent ones of the second named said cutting edges.

4. The tool of claim 2 in which said grooves' fat surfaces have angularities locating said sharp edges at levels slightly below those of said prism's faces.

5. The tool of claim 1 including a tool holder in which a recess is formed having a flat surface substantially corresponding in shape to that of said prism's faces on which either of the faces of said prism may be fitted, said recess having a side wall right angularly extending upwardly against which either of the prism's right angular sides may abut and a second side wall extending upwardly at substantially the same acute angle as that of the prism's said acutely angled sides and against which either of the latter may abut, and means for clamping said prism in said recess.

* * * * *